Figure 1:
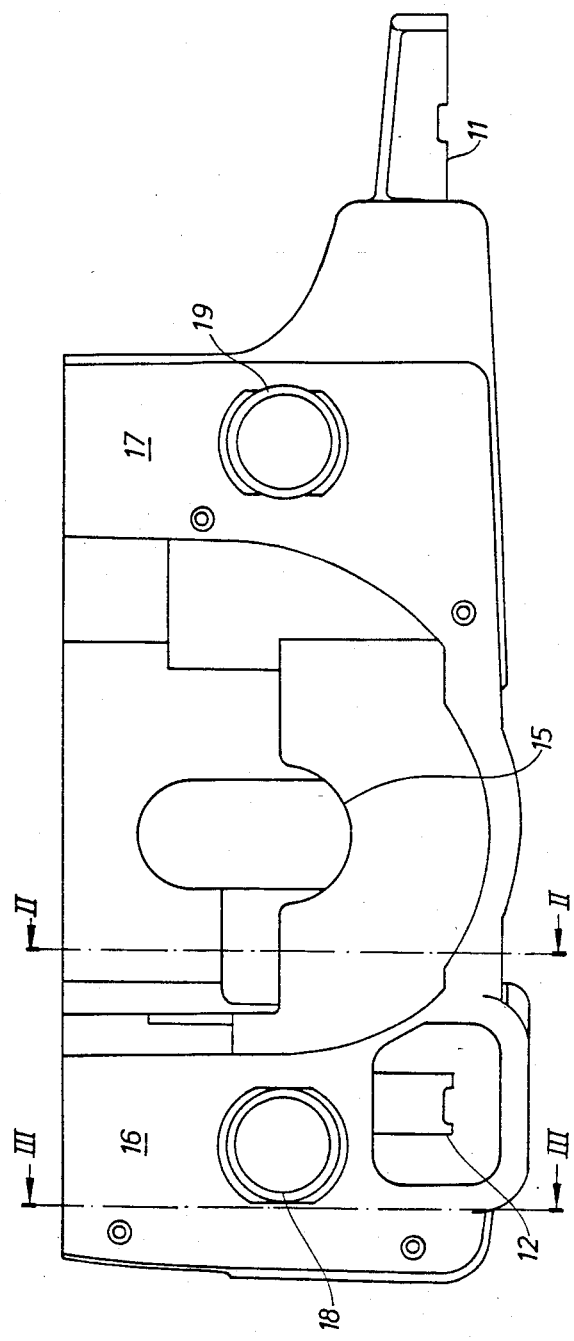

United States Patent [19]

Rangert et al.

[11] Patent Number: 4,700,480
[45] Date of Patent: Oct. 20, 1987

[54] BASE STRUCTURE OF A MOTOR SAW

[75] Inventors: Bo R. Rangert, Mölnlycke; Christer L. Alm, Landvetter, both of Sweden

[73] Assignee: AB Electrolux, Sweden

[21] Appl. No.: 778,671

[22] Filed: Sep. 23, 1985

[30] Foreign Application Priority Data

Oct. 5, 1984 [SE] Sweden ................. 8404998

[51] Int. Cl.⁴ .................. F02B 77/02; F02F 7/00; B23D 57/02
[52] U.S. Cl. .................. 30/383; 30/124; 123/195 C; 123/198 E; 181/204
[58] Field of Search .................. 30/381-385, 30/124; 123/195 C, 198 E, 2; 181/204

[56] References Cited

U.S. PATENT DOCUMENTS

| 3,036,566 | 5/1962 | Dobbertin | 123/198 E |
| 3,857,179 | 12/1974 | Haupt et al. | 30/381 |
| 4,285,309 | 8/1981 | Johansson | 123/195 C |
| 4,434,756 | 3/1984 | Nilsson et al. | 123/195 R |

FOREIGN PATENT DOCUMENTS 2072093 9/1981 United Kingdom ............ 123/2

Primary Examiner—Donald R. Schran
Assistant Examiner—Hien H. Phan
Attorney, Agent, or Firm—Alfred E. Miller

[57] ABSTRACT

A base structure of a motor saw forms fuel and oil tanks (16,17) and a crankcase bottom in one piece. This piece is injection moulded in plastics with closed tank cavities obtained by means of cores in the mould which are made of a metal having a melting temperature lower than the softening temperature of the plastic material. After moulding the cores are melted by heat treatment and the metal runs out through filling holes (18,19) of the tanks. Armouring pieces are moulded in the plastics to reinforce the attachments of crankshaft bearings and the guide bar.

6 Claims, 3 Drawing Figures

BASE STRUCTURE OF A MOTOR SAW

The present invention relates to a base structure of a motor saw including fuel and oil tanks and a crankcase bottom. The base structure is intended to be joined to a top portion with which it forms a frame and housing of the motor saw.

In the prior art it is known to make the base structure in two portions, one being the crankcase bottom with tank cavities and the other constituting the tank bottom covering the tank cavities from below. A structure of this kind is described in U.S. Pat. No. 4,285,309.

There are several reasons for using plastic material in lieu of metals in moulded details of a motor saw housing. Besides a reduction of costs owing to less weight by unit of volume, less heat capacity and possibility of colouring of the material, there are properties like less heat conductibility which contribute to an improvement of the product. The designing of details also involves the desire to include a maximum of functions within the smallest possible product volume. The number of functions is restricted by the plasticity and physical/thermal properties of the detail. An i.c. engine is described in U.S. Pat. No. 4,434,756 having a cylinder portion of metal and a crankcase bottom of plastics. The present invention relates to a further development of such an engine by a further reduction of the number of details and an increase of the load characteristic still maintaining the capacity of the tank volumes. In accordance with the invention, the base structure is injection moulded with tank hollows in which the inner cores in the mould are made of a metal with low melting temperature, lower than the softening temperature of the plastic material. By such moulding it is possible to avoid angles of clearance in the mould, whereby an even thickness of the walls is obtained. After moulding the cores are melted by heat treatment and the metal runs out of the cavities which then will form tanks. Armouring pieces are also inserted in the mould to distribute and transfer strains within the base structure. Such strains occur at the crankshaft bearing and the cylinder and guide bar attachments, but due to the armouring pieces loosening of bolting and wearing of the plastic material are avoided.

An embodiment of a base structure of a motor saw according to the invention will be described by way of example in the following with reference to the accompanying drawings which show in FIG. 1 a vertical projection of this base structure, FIG. 2 a side-projection with cross sections of the base structure taken along lines II—II of FIG. 1, FIG. 3 a partial cross section of FIG. 1 taken along lines III—III and showing a detail at the guide bar attachment on the base structure.

Figure 2:
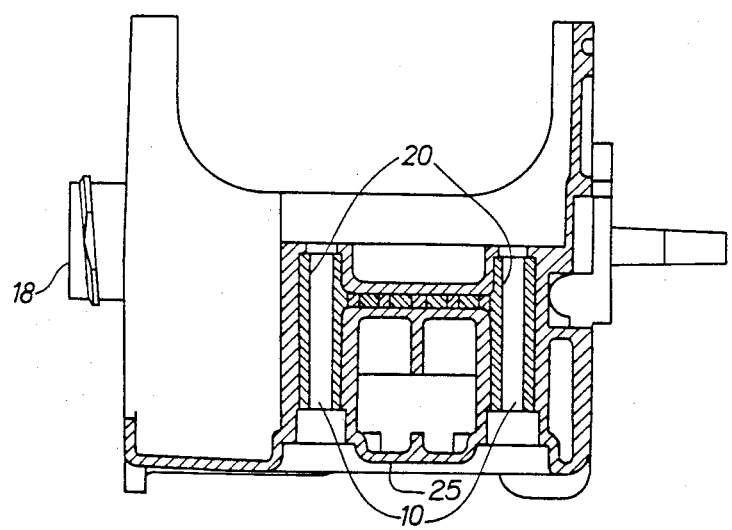
Figure 3:
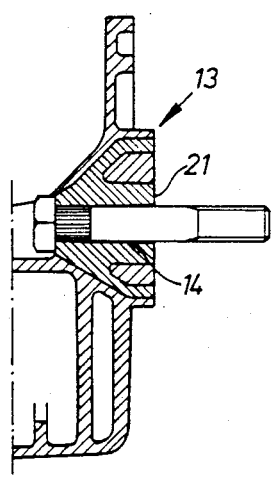

FIGS. 1 and 2 show a base structure of a motor saw made in one piece by injection moulding. As mentioned hereinbefore the base structure together with a top portion forms the frame and the housing of the motor saw. The engine is joined to the base structure by means of screws which penetrate holes 10 extending upwardly from the crankcase bottom 25 thereof and are screwed into the cylinder portion of the engine. The base structure has also a rear handle attachment 11 and a front handle attachment 12. A guide bar attachment 13 (FIG. 1) is positioned on the right side of the base structure where a couple of bolts inserted into holes 14 are used to secure the guide bar. The upper surface of the base structure is provided with semi-cylindrical cavities 15 (FIG. 1) which fit to corresponding cavities in the underside of the cylinder portion. The crankshaft has bearings in the form of ballbearings and is inserted through each pair of the cavities.

The main volume of the base structure is occupied by fuel and oil tanks 16, 17. These are entirely closed and formed directly on a couple of inner cores by the injection moulding, whereby a totally joint-free product is obtained in which the wall material is homogeneous all around the tanks. Each tank has a filling hole 18, 19 provided with a throat with threads for a screw cap. The cores are kept in the mould by means of connections between core and mould positions at the filling holes through the wall which connections, after injection and cooling of the plastics together with the rest of the core material are melted by a special heat treatment and run out through the filling hole 18 and 19, respectively, thus formed in the moulded plastic product. This way of manufacturing offers a great freedom in the geometrical design of the tank cavities, and, moreover, a good finish already at the removal of the product from the mould.

FIG. 2 shows reinforcements in the holes 10 in the form of metal tubes 20 moulded in the plastic piece at the injection. The tubes make a rigid support for screw heads when the crankcase members are screwed together so that tight joints are obtained in the crankcase. In a base structure of plastics the claim for safe screw joints is, of course, as great as in conventional base structures of metal. At places in which the stability is especially important, as at the guide bar attachment (FIG. 3), armouring pieces 21 are moulded in the plastics.

A base structure of the kind here described can include further details of the motor saw, if desired. The description refers to an example which shall not be considered restrictive for the invention, which is defined in the following claims.

We claim:

1. In a base for an internal combustion engine chain saw, the base defining first and second compartments for the storage of gas and oil respectively and being molded of a plastic material; the improvement wherein said compartments are closed compartments substantially completely defined by an integral molded plastic body having walls, ceilings and bottoms of plastic material unitary with said saw base.

2. The base of claim 1 wherein said integral molded plastic body further comprises a rear handle attachment and a front handle attachment, a crank case bottom and a guide bar attachment.

3. The base of claim 1 wherein said integral molded plastic body has a crank case bottom and mounting holes extending therethrough from said crank case bottom, and further comprising metal tubes molded in said plastic body and defining walls of said holes.

4. The base of claim 1 wherein said integral molded plastic body has a crank case bottom, said crank case bottom having semi cylindrical cavities for receiving crank shaft bearings of the engine of said chain saw.

5. The base of claim 1 wherein said compartments have filling holes formed in said integral molded plastic body, said filling holes having throats with external threads.

6. The base of claim 1 wherein said integral molded plastic body comprises a guide bar attachment, and an armoring element molded in said plastic body at said guide bar attachment.

* * * * *